United States Patent [19]

Takahashi et al.

[11] Patent Number: 5,244,851
[45] Date of Patent: Sep. 14, 1993

[54] MICROWAVE DIELECTRIC CERAMIC COMPOSITION

[75] Inventors: Hisakazu Takahashi; Yoko Baba; Kenichi Ezaki; Yasuhiko Okamoto; Kenichi Shibata, all of Osaka; Kazuhiko Kuroki, Kyoto, all of Japan

[73] Assignee: Sanyo Electric Co., Ltd., Osaka, Japan

[21] Appl. No.: 838,881

[22] Filed: Feb. 21, 1992

[30] Foreign Application Priority Data

Feb. 28, 1991 [JP] Japan ............................ 3-34107
Apr. 22, 1991 [JP] Japan ............................ 3-90712
Dec. 17, 1991 [JP] Japan ............................ 3-333385

[51] Int. Cl.⁵ .............................................. C04B 35/46
[52] U.S. Cl. ....................................................... 501/139
[58] Field of Search ........................................... 501/139

[56] References Cited

U.S. PATENT DOCUMENTS

| 4,866,017 | 9/1989 | Okawa | 501/139 |
| 5,013,695 | 5/1991 | Kato et al. | 501/139 |

FOREIGN PATENT DOCUMENTS

| 2343142 | 3/1975 | Fed. Rep. of Germany | 501/139 |
| 0131901 | 10/1980 | Japan | 501/139 |
| 0156367 | 9/1982 | Japan | 501/139 |
| 0086103 | 5/1984 | Japan | 501/139 |

Primary Examiner—Mark L. Bell
Assistant Examiner—Deborah Jones
Attorney, Agent, or Firm—Armstrong, Westerman, Hattori, McLeland & Naughton

[57] ABSTRACT

A microwave ceramic composition containing as main components substances expressed by a composition formula of $x.BaO - y TiO_2 - z.Nd_2O_3$ (where $0.05 <= x <= 0.25$, $0.60 <= y <= 0.85$, and $0.05 <= z <= 0.225$) when their molar fractions are taken as x, y and z $(x+y+z=1)$ and containing as a subcomponent one type selected from the group consisting of $In_2O_3$, $Bi_2O_5$, $GeO_2$ and $V_2O_5$.

5 Claims, 1 Drawing Sheet

MICROWAVE DIELECTRIC CERAMIC COMPOSITION

BACKGROUND OF THE INVENTION

1. Field of the Invention

The present invention relates to dielectric ceramic compositions for use as resonators employed in a microwave frequency band of several gigahertz.

2. Description of the Prior Art

In recent years, attempts to use a dielectric material for a resonator or a filter used in satellite communication, broadcasting and microwave remote communication using a microwave having a frequency of several gigahertz or a transmitter-receiver such as a microwave remote recognition system.

In a resonator using such a dielectric material, the wavelength is decreased to $1/\epsilon^{178}$ (where $\epsilon$ is the dielectric constant) in the dielectric body. Accordingly, the larger the dielectric constant $\epsilon$ of the material is, the smaller the shape of the resonator can be. In addition, the loss of the material must be as low as possible so as to enhance the frequency selectivity and the stability. Furthermore, the temperature coefficient of resonance frequency $\tau f$ of the material is as close to zero as possible so as to increase the temperature setability.

Examples of this type of material conventionally known include materials of a $BaO$ - $TiO_2$ system, a $Ba\{(Zn_\frac{1}{3}(Nb.Ta)_\frac{2}{3}\} O_3$ system, $(Zr Sn) TiO_4$ system, and the like in terms of superior high frequency characteristics. However, the dielectric constants, of all the materials are low, i.e., 20 to 40.

On the other hand, materials having a high dielectric constant include a composition of a $BaO$ - $TiO_2$ - $Nd_2O_3$ system which is proposed in, for example, Japanese Patent Laid-Open Gazette No. 8806/1986.

In this conventional ceramic composition, however, its dielectric constant, is high, i.e., 70 to 90, while its unloaded Q value which is the measure of low loss is small, i.e., approximately 1000 to 2000 in the neighborhood of 3 GHz.

SUMMARY OF THE INVENTION

The present invention has been made in view of the above described points and has for its object to provide a dielectric ceramic composition having a high dielectric constant and a large unloaded Q value which affects the frequency selectivity and the stability.

Another object of the present invention is to improve the temperature coefficient of resonance frequency in a ceramic composition of a $BaO$ - $TiO_2$ - $Nd_2O_3$ system.

A microwave dielectric ceramic composition according to a first embodiment of the present invention contains as main components substances expressed by a composition formula of x. $BaO$ - y $TiO_2$ - z $Nd_2O_3$ (where $0.05<=x<=0.25$, $0.60<=y<=0.85$, and $0.05<=z<=0.225$) when their molar fractions are taken as x, y and z ($x+y+z=1$) and contains as a subcomponent one type of $In_2O_3$, $Bi_2O_5$, $GeO_2$ and $V_2O_5$.

In the microwave dielectric ceramic composition according to the first embodiment of the present invention, any one type of the subcomponents $In_2O_3$, $Bi_2O_5$, $GeO_2$ and $V_2O_5$ is added to the main components $BaO$ - $TiO_2$ - $Nd_2O_3$, so that its dielectric constant $\epsilon$ and its unloaded Q value are increased. At the same time, the sintering properties of the dielectric ceramic composition are improved and the temperature coefficient of resonance frequency $\tau$ f thereof is decreased by adding the subcomponent.

Furthermore, the microwave dielectric ceramic composition according to the first embodiment of the present invention may contain not more than 10 parts by weight of the above described subcomponent $In_2O_3$, $Bi_2O_5$ or $GeO_2$ with respect to 100 parts by weight of the above described substances which are main components.

Additionally, the microwave dielectric ceramic composition according to the first embodiment of the present invention may contain not more than 5 parts by weight of the above described subcomponent $V_2O_5$ with respect to 100 parts by weight of the above described substances which are main components.

A microwave dielectric ceramic composition according to a second embodiment of the present invention contains as main components substances expressed by a composition formula of x $BaO$ - y.$TiO_2$ - z $Nd_2O_3$ (where $0.05<=x<=0.25$, $0.60<=y<=0.85$, and $0.05<=x<=0.225$) when their molar fractions are taken as x, y and z ($x+y+z=1$) and contains as subcomponents at least one of $In_2O_3$ and $Al_2O_3$ or $Bi_2O_5$ and $Al_2O_3$.

In the microwave dielectric ceramic composition according to the second embodiment of the present invention, at least one of $In_2O_3$ and $Al_2O_3$ or $Bi_2O_5$ and $Al_2O_3$ are added as subcomponents to the main components $BaO$ - $TiO_2$ - $Nd_2O_3$, thereby to further decrease its temperature coefficient of resonance frequency $\tau$ f.

Furthermore, the microwave dielectric ceramic composition according to the second embodiment of the present invention may contain not more than 10 parts by weight of the above described subcomponent $In_2O_3$ and not more than 5 parts by weight of the above described subcomponent $Al_2O_3$ with respect to 100 parts by weight of the above described substances which are main components.

Additionally, the microwave dielectric ceramic composition according to the second embodiment of the present invention may contain not more than 10 parts by weight of the above described subcomponent $Bi_2O_5$ and not more than 5 parts by weight of the above described subcomponent $Al_2O_3$ with respect to 100 parts by weight of the above described substances which are main components.

A microwave dielectric ceramic composition according to a third embodiment of the present invention contains as main components substances expressed by a composition formula of x $BaO$ - y.$TiO_2$- z.$Nd_2O_3$ (where $0.05<=x<=0.25$, $0.60<=y<=0.85$, $0.05<=z<=0.225$) when their molar fractions are taken as x, y and z ($x+y+z=1$) and contains as subcomponents at least one of $GeO_2$ or $Bi_2O_5$ and one of $Al_2O_3$, $CeO_2$ or $TeO_2$.

In the microwave dielectric ceramic composition according to the third embodiment of the present invention, at least one $GeO_2$ or $Bi_2O_5$ and one of $Al_2O_3$, $CeO_2$ or $TeO_2$ are added as subcomponents to the main components $BaO$ - $TiO_2$ - $Nd_2O_3$, thereby to further decrease its temperature coefficient of resonance frequency $\tau$ f.

Furthermore, the microwave dielectric ceramic composition according to the third embodiment of the present invention may contain not more than 5 parts by weight of the above described subcomponent $GeO_2$ and not more than 5 parts by weight of the above described subcomponent $Al_2O_3$ with respect to 100 parts by weight of the above described substances which are main components.

Additionally, the microwave dielectric ceramic composition according to the third embodiment of the present invention may contain not more than 10 parts by weight of the above described subcomponent $Bi_2O_5$ and not more than 10 parts by weight of the above described subcomponent $CeO_2$ with respect to 100 parts by weight of the above described substances which are main components.

Moreover, the microwave dielectric ceramic composition according to the third embodiment of the present invention may contain not more than 10 parts by weight of the above described subcomponent $Bi_2O_5$ and not more than 10 parts by weight of the above described subcomponent $TeO_2$ with respect to 100 parts by weight of the above described substances which are main components.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
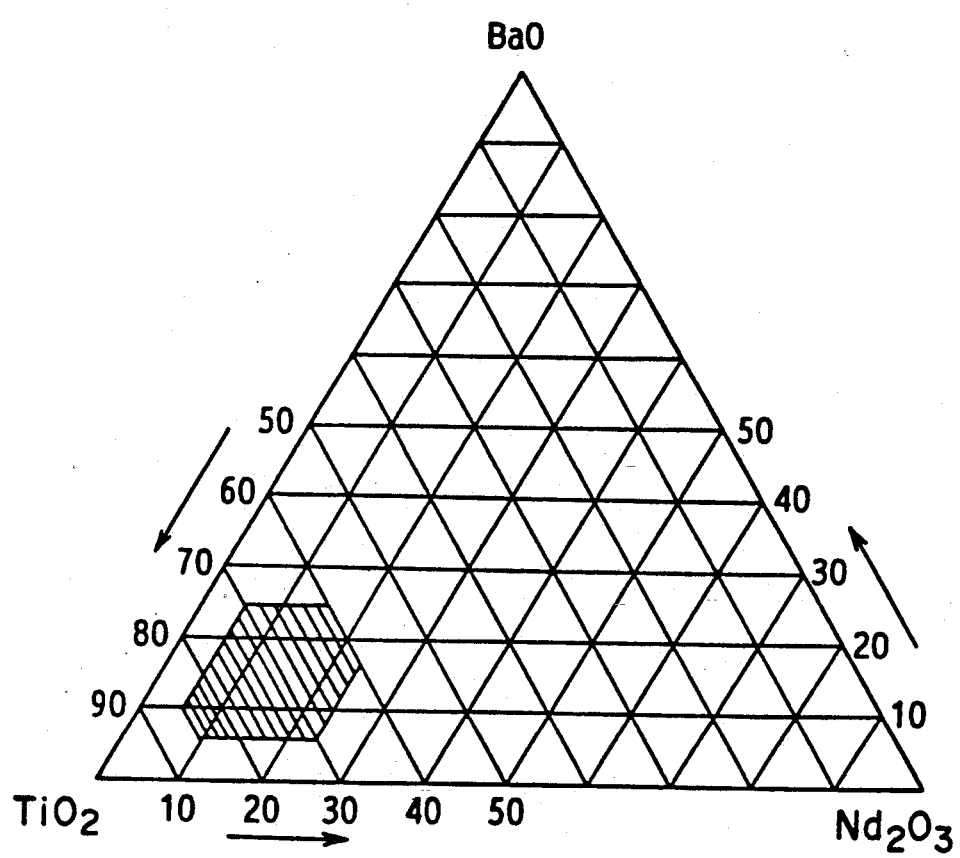
FIG. 1 is a ternary diagram showing a composition ratio of main components $BaO$ - $TiO_2$ - $Nd_2O_3$ of a microwave dielectric ceramic composition according to the present invention.

Description is now made of a method of fabricating a microwave dielectric ceramic composition according to a first embodiment of the present invention.

As raw materials of main components, high-purity powders (not less than 99.9%) of $TiO_2$, $BaCO_2$ and $Nd_2O_3$ were weighed so as to be predetermined molar fractions. In addition, as a raw material of a subcomponent, a predetermined amount of a high-purity powder (not less than 99.9 %) of one of $In_2O_3$, $Bi_2O_5$, $GeO_2$ and $V_2O_5$ was weighed. For example, used as $TiO_2$ is one of a high-purity grade which is manufactured by Toho Titanium Co., Ltd., used as $BaCO_3$ is one of a 3N grade which is manufactured by Kojundo Kagaku Co., Ltd., used as $Nd_2O_3$ is one of a 3N grade which is manufactured by Mitui Mining and Smelting Co., Ltd., used as $In_2O_3$ is one of a 3N grade which is manufactured by Mitui Mining and Smelting Co., Ltd., used as $Bi_2O_5$ is one of a reagent grade which is manufactured by Kojundo Kagaku Co., Ltd., used as $GeO_2$ is one of a 3N grade which is manufactured by Mitui Mining and Smelting Co., Ltd., and used as $V_2O_5$ is one of a 3N grade which is manufactured by Mitui Mining and Smelting Co., Ltd.

Description is now made of a specific example of the fabrication of the microwave dielectric ceramic composition according to the first embodiment using the above described raw materials.

First, as molar fractions of $TiO_2$, $BaCO_3$ and $Nd_2O_3$, $TiO_2$ shall be 0.765 mole, $BaCO_3$ shall be 0.125 mole, and $Nd_2O_3$ shall 0.11 mole.

One of $In_2O_3$, $Bi_2O_5$, $GeO_2$ and $V_2O_5$ is added as a subcomponent to $TiO_2$, $BaCO_3$ and $Nd_2O_3$. A predetermined amount of $In_2O_3$, $Bi_2O_5$ or $GeO_2$ of the subcomponents is weighed so that the content thereof is not more than 10 parts by weight with respect to 100 parts by weight of the main components $TiO_2$, $BaCO_3$ and $Nd_2O_3$.

Furthermore, a predetermined amount of $V_2O_5$ of the subcomponents is weighed so that the content thereof is not more than 5 parts by weight with respect to 100 parts by weight of the main components.

The raw material powders, a nylon ball of 15 $\phi$ and ethyl alcohol were put in a nylon pot, mixed in the following condition and wet-blended for 5 to 20 hours and particularly, 8 hours in the first embodiment.

Raw material powders : Nylon ball : Ethyl Alcohol = 100 g : 500 g : 500 cc

The blended powder was then dried at 120° C. for 24 hours. The dried powder was crushed in a mortar made of alumina, and the crushed powder was packed in a boat made of magnesia (MgO) and calcined at 900 to 1200° C. for 1 to 5 hours and particularly, at 1150° C. for 2 hours in the first embodiment. The calcined powder was crushed again in the mortar.

This crushed powder was put under the nylon pot in the following condition and water-ground for 20 to 60 hours and particularly, for 30 hours in the present embodiment.

Crushed powder : Nylon ball : Ethyl Alcohol = 100 g : 1000 g : 500 cc

Subsequently, this ground powder was dried at 120° C. for 24 hours. The dried ground powder was crushed, and a 10 % solution of polyvinyl alcohol was mixed as a binder so as to account for three percent of 50 g of the powder using the mortar to granulate the powder. The granulated powder was dried at 100° C. for 5 hours.

Thereafter, the dried powder was classified using two screens, that is, a 100-mesh screen (150 μm) and a 200-mesh screen (75 μm), to obtain only grains having a diameter of 75 to 150 μm.

The classified powder was pressed into a disc having a diameter of 10 mm and a thickness of 6 mm at a pressure of 2000 to 3000 Kg/cm² and preferably, 2550 Kg/cm² in the present embodiment.

Subsequently, the pressed forming powder was put in a boat for sintering made of alumina with a plate made of zirconia ($ZrO_2$) being laid on its bottom, and was sintered for two hours at 350°, for two hours at 600° and for five hours at 1300° C. at a heating rate of 150°C/H. Both surfaces of the sintered object ware polished using abrasive powder FO-800# manufactured by, for example, Fujimi Abrasive Co., Ltd. such that the thickness of the sintered object is one-half of its diameter. In addition, both surfaces of the polished object were polished clean again using wet abrasive paper 1500#. Thereafter, the polished object was ultrasonically cleaned by acetone and finally, dried at 100° C. for 2 hours to prepare a sample.

The dielectric constant $\epsilon$ and the Q value of the sample thus prepared were measured using a network analyzer (YHP 8510B) in the neighborhood of the measurement frequency of 3 GHz using the dielectric resonator method (Hakki-Coleman method). In addition, the temperature coefficient of the resonance frequency $\tau f$ was calculated from the following equation by putting a measuring system in a constant temperature bath to measure the change in resonance frequency at 20 to 70° C.:

$$\tau f = \frac{F_{70} - F_{20}}{F_{20} \times \Delta T} \times 10^6 \text{ (PPM/°C.)}$$

where $F_{70}$ denotes a resonance frequency at 70° C., $F_{20}$ denotes a resonance frequency at 20° C., and $\Delta T$ denotes a temperature difference.

Table 1 to Table 4 show the results of measurements made when $In_2O_3$, $Bi_2O_5$, $GeO_2$ and $V_2O_5$ are respectively used as subcomponents. In any case, the mixture ratio of $BaO_2$, $TiO_2$ and $Nd_2O_3$ which are main components is 0.125 : 0.765 : 0.11 in this order in terms of molar fractions.

In the tables, asterisked samples are samples beyond the scope of the present invention.

[TABLE 1]

| sample number | $In_2O_3$ (part by weight) | dielectric properties | | | note |
|---|---|---|---|---|---|
| | | dielectric constant $\epsilon$ | Q value | $\tau f$(PPM/°C.) | |
| *1 | 0 | 62 | 2400 | +162 | inferior sintering properties |
| 2 | 1.0 | 77 | 4300 | +119 | |
| 3 | 2.5 | 76 | 4100 | +113 | |
| 4 | 5.0 | 73 | 4080 | +109 | |
| 5 | 7.5 | 70 | 3900 | +106 | |
| 6 | 10.0 | 67 | 3700 | +100 | |
| *7 | 15.0 | 59 | 2800 | +95 | |

[TABLE 2]

| sample number | $Bi_2O_5$ (part by weight) | dielectric properties | | | note |
|---|---|---|---|---|---|
| | | dielectric constant $\epsilon$ | Q value | $\tau f$(PPM/°C.) | |
| 8 | 1.0 | 81 | 3500 | +112 | |
| 9 | 2.5 | 84 | 2400 | +104 | |
| 10 | 5.0 | 88 | 3300 | +99 | |
| 11 | 7.5 | 91 | 2900 | +90 | |
| 12 | 10.0 | 93 | 2500 | +87 | |
| 13 | 15.0 | 91 | 1700 | +79 | |

[TABLE 3]

| sample number | $GeO_2$ (part by weight) | dielectric properties | | | note |
|---|---|---|---|---|---|
| | | dielectric constant $\epsilon$ | Q value | $\tau f$(PPM/°C.) | |
| 14 | 1.0 | 80 | 3500 | +140 | |
| 15 | 2.5 | 80 | 2800 | +132 | |
| 16 | 5.0 | 79 | 3800 | +125 | |
| 17 | 7.5 | 75 | 3400 | +115 | |
| 18 | 10.0 | 71 | 2700 | +107 | |
| *19 | 15.0 | 61 | 1700 | +101 | |

[TABLE 4]

| sample number | $V_2O_5$ (part by weight) | dielectric properties | | | note |
|---|---|---|---|---|---|
| | | dielectric constant $\epsilon$ | Q value | $\tau f$(PPM/°C.) | |
| 20 | 1.0 | 78 | 3100 | +145 | |
| 21 | 2.5 | 76 | 3300 | +141 | |
| 22 | 5.0 | 58 | 3500 | +134 | |
| *23 | 7.5 | 41 | 3600 | +115 | |

As can be seen from Tables 1 to 4, the dielectric constant $\epsilon$ and the Q value are increased, compared to those of sample 1 having no subcomponent added thereto, by adding the subcomponent to the main components. In addition, the temperature coefficient of resonance frequency $\tau f$ is decreased by adding the subcomponent.

However, the dielectric constant $\epsilon$ is decreased if the amount of addition of $In_2O_3$ exceeds 10 parts by weight and the amount of addition of $V_2O_5$ exceeds 5 parts by weight with respect to 100 parts by weight of the main components. In addition, the Q value is decreased if the amounts of addition of $Bi_2O_5$ and $GeO_2$ respectively exceed 10 parts by weight.

Additionally the dielectric properties vary depending on the composition ratio of the main components $BaO_2$, $TiO_2$ and $Nd_2O_3$. The results of experiments made by varying the composition ratio (molar ratio) of $BaO_2$, $TiO_2$ and $Nd_2O_3$ with $In_2O_3$ added as a subcomponent are shown in Table 5.

[TABLE 5]

| sample number | composition (mole %) | | | sub component (part by weight) | dielectric properties | | | note |
|---|---|---|---|---|---|---|---|---|
| | $BaO_2$ | $TiO_2$ | $Nd_2O_3$ | $In_2O_3$ | $\epsilon$ | Q value | $\tau f$(PPM/°C.) | |
| *24 | 0.275 | 0.65 | 0.075 | 2.5 | 43 | — | — | inferior sintering |
| 25 | 0.25 | 0.70 | 0.05 | 2.5 | 55 | 2100 | +71 | |
| 26 | 0.25 | 0.60 | 0.15 | 2.5 | 51 | 2000 | +42 | |
| *27 | 0.225 | 0.575 | 0.20 | 2.5 | — | — | — | inferior sintering |
| *28 | 0.21 | 0.68 | 0.11 | 0 | 51 | 1500 | +63 | |
| 29 | 0.21 | 0.68 | 0.11 | 2.5 | 63 | 3100 | +58 | |
| *30 | 0.185 | 0.64 | 0.175 | 0 | 32 | 2500 | +22 | |
| 31 | 0.185 | 0.64 | 0.175 | 2.5 | 50 | 2800 | +17 | |
| *32 | 0.16 | 0.72 | 0.12 | 0 | 62 | 2800 | +63 | |
| 33 | 0.16 | 0.72 | 0.12 | 2.5 | 68 | 3900 | +39 | |
| 34 | 0.175 | 0.60 | 0.225 | 2.5 | 63 | 2600 | +27 | |

[TABLE 6]

| sample number | composition (mole %) | | | sub component (part by weight) | dielectric properties | | | note |
|---|---|---|---|---|---|---|---|---|
| | $BaO_2$ | $TiO_2$ | $Nd_2O_3$ | $In_2O_3$ | $\epsilon$ | Q value | $\tau f$(PPM/°C.) | |
| *35 | 0.14 | 0.82 | 0.04 | 2.5 | 94 | 2400 | +189 | |
| *36 | 0.10 | 0.65 | 0.25 | 2.5 | 89 | 1600 | +143 | |
| *37 | 0.10 | 0.74 | 0.16 | 0 | 69 | 1400 | +165 | |

[TABLE 6]-continued

| sample number | composition (mole %) | | | sub component (part by weight) | dielectric properties | | | note |
|---|---|---|---|---|---|---|---|---|
| | BaO$_2$ | TiO$_2$ | Nd$_2$O$_3$ | In$_2$O$_3$ | ε | Q value | τf(PPM/°C.) | |
| 38 | 0.10 | 0.74 | 0.16 | 2.5 | 74 | 3800 | +137 | |
| *39 | 0.085 | 0.81 | 0.105 | 0 | 81 | 2400 | +167 | |
| 40 | 0.085 | 0.81 | 0.105 | 2.5 | 86 | 2900 | +135 | |
| 41 | 0.10 | 0.85 | 0.05 | 2.5 | 82 | 4200 | +141 | |
| *42 | 0.05 | 0.88 | 0.07 | 2.5 | 94 | 1400 | +255 | |
| 43 | 0.05 | 0.85 | 0.10 | 2.5 | 77 | 3000 | +155 | |
| 44 | 0.05 | 0.725 | 0.225 | 2.5 | 52 | 1500 | +15 | |
| *45 | 0.03 | 0.78 | 0.19 | 2.5 | 44 | 850 | +23 | |

As can be seen from Tables 5 and 6, the dielectric constant ε, the Q value, and the temperature coefficient of resonance frequency τf vary depending on the composition ratio of BaO$_2$, TiO$_2$ and Nd$_2$O$_3$. In the present invention, the composition ratio is restricted for the following reasons.

More specifically, the sintering properties are degraded if BaO$_2$ exceeds 0.25 mole, and the dielectric constant ε and the Q value are decreased if it is less than 0.05 mole. In addition, the Q value is decreased and the temperature coefficient of resonance frequency τ f is increased if TiO$_2$ exceeds 0.85 mole, and the sintering properties are degraded if it is less than 0.60 mole. Further, the Q value is decreased and the temperature coefficient of resonance frequency τ f is increased if Nd$_2$O$_3$ exceeds 0.225 mole, and the temperature coefficient of resonance frequency τ f is increased if it is less than 0.05 mole.

In the above-described first embodiment, a ceramic composition is obtained which contains as main components BaO - TiO$_2$ - Nd$_2$O$_3$ and has In$_2$O$_3$, Bi$_2$O$_5$, GeO$_2$ or V$_2$O$_5$ added thereto as a subcomponent to improve its Q value. In the ceramic composition according to the first embodiment, however, its temperature coefficient of resonance frequency τ f is somewhat large. In the second embodiment, therefore, the temperature coefficient of resonance frequency τ f of a ceramic composition of a BaO - TiO$_2$ - Nd$_2$O$_3$ system is further improved.

Description is made of the second embodiment of the present invention.

As raw materials, high-purity powders (not less than 99.9%) of BaCO$_3$, TiO$_2$ and Nd$_2$O$_3$ to be main components were weighed in predetermined molar fractions, and predetermined amounts of high-purity powders (not less than 99.9%) of one of In$_2$O$_3$ and Al$_2$O$_3$ or Bi$_2$O$_5$ and Al$_2$O$_3$ to be subcomponents were weighed. The powders are mixed with each other, to complete a sample in the same manner as that in the first embodiment.

The dielectric constant ε, the Q value, and the temperature coefficient of resonance frequency τ f of the sample thus made were measured in the neighborhood of the measurement frequency of 3 GHz using the Hakki-Coleman method.

Table 7 and Table 8 show the results of measurements made with respect to samples respectively containing a combination of the subcomponents In$_2$O$_3$ and Al$_2$O$_3$ and a combination of the subcomponents Bi$_2$O$_5$ and Al$_2$O$_3$ by varying the respective amounts of addition. The mixture ratio of the main components BaO, TiO$_2$ and Nd$_2$O$_3$ was 0.163 : 0.723 : 0.114 in this order in terms of molar fractions.

In the tables, asterisked samples are samples beyond the scope of the present invention.

[TABLE 7]

| sample number | amount of addition (part by weight) | | dielectric properties | | | note |
|---|---|---|---|---|---|---|
| | In$_2$O$_3$ | Al$_2$O$_3$ | dielectric constant ε | Q value | τf(PPM/°C.) | |
| 46* | 0.0 | 0.0 | 59 | 1500 | +180 | inferior sintering |
| 47 | 1.0 | 3.0 | 57 | 2710 | +34 | |
| 48 | 3.0 | 3.0 | 53 | 2540 | +38 | |
| 49 | 5.0 | 3.0 | 53 | 2090 | +33 | |
| 50 | 10.0 | 3.0 | 53 | 1250 | +22 | |
| 51* | 15.0 | 3.0 | 51 | 1033 | +21 | |
| 52 | 3.0 | 1.0 | 54 | 1830 | +33 | |
| 53 | 3.0 | 5.0 | 54 | 1980 | +29 | |
| 54* | 3.0 | 7.5 | 33 | 2530 | +14 | |

[TABLE 8]

| sample number | amount of addition (part by weight) | | dielectric properties | | | note |
|---|---|---|---|---|---|---|
| | Bi$_2$O$_5$ | Al$_2$O$_3$ | dielectric constant ε | Q value | τf(PPM/°C.) | |
| 55 | 1.0 | 3.0 | 55 | 3170 | +33 | |
| 56 | 3.0 | 3.0 | 74 | 1470 | +13 | |
| 57 | 5.0 | 3.0 | 62 | 2220 | +18 | |
| 58 | 10.0 | 3.0 | 56 | 2454 | +22 | |
| 59* | 15.0 | 3.0 | 76 | 760 | +27 | |
| 60 | 3.0 | 1.0 | 51 | 2670 | +23 | |
| 61 | 3.0 | 5.0 | 56 | 1910 | +20 | |
| 62* | 3.0 | 7.5 | 27 | 2000 | −12 | |

As can be seen from Tables 7 and 8, the temperature coefficient of resonance frequency τ f is decreased by one-sixth to one-ninth, as compared with Sample 46 having no subcomponents added thereto, by adding the subcomponents to the main components.

However, the Q value is decreased if the amount of addition of In$_2$O$_3$ and Bi$_2$O$_5$, respectively, exceeds 10 parts by weight with respect to 100 parts by weight of the main components, and the dielectric constant τ is decreased if the addition of Al$_2$O$_3$ exceeds 5 parts by weight.

Additionally, the dielectric properties vary depending on the composition ratio of BaO, TiO$_2$ and Nd$_2$O$_3$ which are main components. The results of measurements made by varying the composition ratio (molar ratio) of BaO, TiO$_2$ and Nd$_2$O$_3$ are shown in Table 9 and Table 10. Table 9 shows the results obtained when 2.5 parts by weight of In$_2$O$_3$ and Al$_2$O$_3$ are added as subcomponents, and FIG. 10 shows the results obtained when 2.5 parts by weight of $Bi_2O_5$ and $Al_2O_3$ are added as subcomponents.

[TABLE 9]

| sample number | composition (mole %) | | | dielectric properties | | |
|---|---|---|---|---|---|---|
| | BaO | TiO$_2$ | Nd$_2$O$_3$ | dielectric constant $\epsilon$ | Q value | $\tau f$(PPM/°C.) |
| 63 | 0.17 | 0.70 | 0.13 | 59 | 2830 | +40 |
| 64 | 0.19 | 0.68 | 0.13 | 55 | 3990 | +21 |
| 65 | 0.19 | 0.69 | 0.12 | 56 | 3690 | +23 |
| 66 | 0.19 | 0.64 | 0.17 | 64 | 2720 | +19 |

[TABLE 10]

| sample number | composition (mole %) | | | dielectric properties | | |
|---|---|---|---|---|---|---|
| | BaO | TiO$_2$ | Nd$_2$O$_3$ | dielectric constant $\epsilon$ | Q value | $\tau f$(PPM/°C.) |
| 67 | 0.17 | 0.70 | 0.13 | 67 | 2700 | +31 |
| 68 | 0.18 | 0.70 | 0.12 | 62 | 3170 | +23 |
| 69 | 0.18 | 0.72 | 0.10 | 64 | 2230 | +24 |
| 70 | 0.19 | 0.69 | 0.12 | 60 | 2970 | +31 |

As can be seen from Tables 9 and 10, the dielectric constant $\epsilon$, the Q value, and the temperature coefficient of resonance frequency $\tau f$ vary depending on the composition ratio of BaO, TiO$_2$ and Nd$_2$O$_3$.

Also in the second embodiment, the following are verified, as in the first embodiment: The sintering properties are degraded if BaO exceeds 0.25 mole, and the dielectric constant $\epsilon$ and the Q value are decreased if it is less than 0.05 mole. In addition, the Q value is decreased and the temperature coefficient of resonance frequency $\tau f$ is increased if TiO$_2$ exceeds 0.85 mole, and the sintering properties are degraded if it is less than 0.06 mole. Further, the Q value is decreased and the temperature coefficient of resonance frequency $\tau f$ is increased if Nd$_2$O$_3$ exceeds 0.225 mole, and the temperature coefficient of resonance frequency $\tau f$ is increased if it less than 0.05 mole.

In a third embodiment, the temperature coefficient of resonance frequency $\tau f$ of a ceramic composition of a BaO - TiO$_2$ - Nd$_2$O$_3$ system is further improved, as in the second embodiment.

Description is made of the third embodiment of the present invention.

A microwave dielectric ceramic composition according to the third embodiment contains as main components BaO - TiO$_2$ - Nd$_2$O$_3$ and has (1) GeO$_2$ and Al$_2$O$_3$, (2) Bi$_2$O$_5$ and CeO$_2$, or (3) Bi$_2$O$_5$ and TeO$_2$ added thereto as subcomponents.

As raw materials, high-purity powders (not less than 99.9% of BaCO$_3$, TiO$_2$ and Nd$_2$O$_3$ to be main components were weighed so as to be predetermined molar fractions, and predetermined amounts of high-purity powders (not less than 99.9 %) of GeO2, Al$_2$O$_3$, Bi$_2$O$_5$, CeO$_2$ and TeO$_2$ to be subcomponents were weighed, to complete a sample in the same manner as that in the first embodiment.

The dielectric constant $\epsilon$, the Q value, and the temperature coefficient of resonance frequency $\tau f$ of the samples thus completed were measured in the neighborhood of the measurement frequency of 3 GHz using the Hakki-Coleman method.

Description is now made of the results of the measurements.

Table 11, Table 12 and Table 13, respectively, show the results of the measurements of samples respectively containing (1) a combination of the subcomponents GeO$_2$ and Al$_2$O$_3$, (2) a combination of the subcomponents Bi$_2$O$_5$ and CeO$_2$, and (3) a combination of the subcomponents Bi$_2$O$_5$ and TeO$_2$ by varying the respective amounts of addition. The mixture ratio of the main components BaO, TiO$_2$ and Nd$_2$O$_3$ was 0.163 : 0.723 : 0.114 in this order in terms of molar fractions.

In the Tables asterisked samples are samples beyond the scope of the present invention.

[TABLE 11]

| sample number | amount of addition (part by weight) | | dielectric properties | | | note |
|---|---|---|---|---|---|---|
| | GeO$_2$ | Al$_2$O$_3$ | dielectric constant $\epsilon$ | Q value | $\tau f$(PPM/°C.) | |
| 71* | 0.0 | 0.0 | 59 | 1500 | +180 | inferior sintering |
| 72 | 2.5 | 0.0 | 65 | 3422 | +85 | |
| 73 | 1.0 | 3.0 | 61 | 2984 | +51 | |
| 74 | 3.0 | 3.0 | 58 | 3065 | +51 | |
| 75 | 5.0 | 3.0 | 57 | 3399 | +67 | |
| 76* | 10.0 | 3.0 | 42 | 2252 | +119 | |
| 77* | 15.0 | 3.0 | 39 | 2303 | +137 | |
| 78 | 3.0 | 1.0 | 62 | 3162 | +55 | |
| 79 | 3.0 | 5.0 | 55 | 3421 | +52 | |
| 80* | 3.0 | 7.5 | 20 | 1762 | +34 | |

[TABLE 12]

| sample number | amount of addition (part by weight) | | dielectric properties | | | note |
|---|---|---|---|---|---|---|
| | Bi$_2$O$_5$ | CeO$_2$ | dielectric constant $\epsilon$ | Q value | $\tau f$(PPM/°C.) | |
| 81* | 2.5 | 0.0 | 70 | 2640 | +74 | |
| 82 | 3.0 | 1.0 | 71 | 2182 | +45 | |
| 83 | 3.0 | 2.5 | 71 | 2131 | +46 | |
| 84 | 3.0 | 7.5 | 75 | 1856 | +53 | |
| 85 | 3.0 | 10.0 | 78 | 2048 | +58 | |
| 86* | 3.0 | 15.0 | 68 | 811 | +64 | |
| 87 | 1.0 | 5.0 | 72 | 2368 | +65 | |
| 88 | 5.0 | 5.0 | 80 | 1991 | +55 | |
| 89 | 10.0 | 5.0 | 91 | 1518 | +46 | |

[TABLE 13]

| sample number | amount of addition (part by weight) | | dielectric properties | | | note |
|---|---|---|---|---|---|---|
| | Bi$_2$O$_5$ | Al$_2$O$_3$ | dielectric constant $\epsilon$ | Q value | $\tau f$(PPM/°C.) | |
| 90 | 3.0 | 1.0 | 67 | 2138 | +51 | |
| 91 | 3.0 | 5.0 | 56 | 1977 | +67 | |
| 92 | 3.0 | 7.5 | 59 | 1854 | +85 | |
| 93 | 3.0 | 10.0 | 56 | 1779 | +98 | |
| 94* | 3.0 | 15.0 | 35 | 1485 | +94 | |
| 95 | 1.0 | 2.5 | 61 | 2243 | +63 | |
| 96 | 5.0 | 2.5 | 66 | 1888 | +52 | |
| 97 | 10.0 | 2.5 | 80 | 1480 | +56 | |

As can be seen from Tables 11 to 13, the temperature coefficient of resonance frequency $\tau f$ is decreased by one-half to one-fourth, as compared with the sample 71 having no subcomponents added thereto, by adding the subcomponents to the main components. In addition, the dielectric constant , and the Q value also become high.

However, the dielectric constant $\epsilon$ is decreased if the amount of the subcomponents GeO$_2$ and Al$_2$O$_3$ respectively, shown in Table 11 exceeds 5 parts by weight with respect to 100 parts by weight of the main components. In addition, the Q value is decreased if the amount of the subcomponents $Bi_2O_5$ and $CeO_2$, respectively, shown in Table 12 exceeds 10 parts by weight. Further, the dielectric constant $\epsilon$ is decreased if the amount of the subcomponents $Bi_2O_5$ and $TeO_2$, respectively, exceeds 10 parts by weight.

Accordingly, the amounts of addition of the subcomponents $GeO_2$ and $Al_2O_3$ are respectively not more than 5 parts by weight with respect to 100 parts by weight of the main components, the amounts of addition of the subcomponents $Bi_2O_5$ and $CeO_2$ are respectively not more than 10 parts by weight with respect to 100 parts by weight of the main components, and the amount of addition of the subcomponents $Bi_2O_5$ and $TeO_2$ are respectively not more than 10 parts by weight with respect to 100 parts by weight of the main components.

Also in the third embodiment, the following are verified as in the first and second embodiments: The sintering properties are degraded if BaO exceeds 0.25 mole dielectric constant and the Q value are decreased if the BaO control is less than 0.05 mole. In addition, the Q value is decreased and the temperature coefficient of resonance frequency $\tau f$ is increased if $TiO_2$ exceeds 0.85 mole, and the sintering properties are degraded if the $TiO_2$ content is less than 0.60 mole. Further, the Q value is decreased and the temperature coefficient of resonance frequency $\tau f$ is increased if $Nd_2O_3$ exceeds 0.225 mole, and the temper coefficient of resonance frequency $\tau f$ is increased if the $Nd_2O_3$ is less than 0.05 mole.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microwave dielectric ceramic composition comprising:
   a) $x.BaO\text{-}y.TiO_2\text{-}z.Nd_2O_3$ and
   b) 10 parts by weight of a member of the group consisting of $In_2O_3$ and $GeO_2$ per 100 parts by weight of (a),
   wherein x, y, and z are molar fractions, $0.05 \leq x \leq 0.25$, $0.60 \leq y \leq 0.85$, $0.05 \leq z \leq 0.225$, and $x+y+z=1$.

2. A microwave dielectric ceramic composition comprising:
   a) $x.BaO\text{-}y.TiO_2\text{-}z.Nd_2OI_3$ and
   b) 5 parts by weight of $V_2O_5$ per 100 parts by weight of (a),
   wherein x, y, and z are molar fractions, $0.05 \leq x \leq 0.25$, $0.60 \leq y \leq 0.85$, $0.05 \leq z \leq 0.225$, and $x+y+z=1$.

3. A microwave dielectric ceramic composition comprising:
   a) $x.BaO\text{-}y.TiO_2\text{-}z.Nd_2O_3$ and
   b) a member of the group consisting of $\iota$) $In_2O_3$ and $Al_2O_3$ and $\mu$) $Bi_2O_5$ and $Al_2O_3$, including 10 parts by weight of $In_2O_3$ or $Bi_2O_5$ and parts by weight $Al_2O_3$ per 100 parts by weight of (a),
   wherein x, y, and z are molar fractions, $0.05 \leq x \leq 0.25$, $0.60 \leq y \leq 0.85$, $0.05 \leq z \leq 0.225$, and $x+y+z=1$.

4. A microwave dielectric ceramic composition comprising:
   a) $x.BaO\text{-}y.TiO_2\text{-}z.Nd_2O_3$ and
   b) a member of the group consisting of $\iota$) $GeO_2$ and $Al_2O_3$, $\mu$) $Bi_2O_5$ and $CeO_2$, and $\iota\iota\iota$) $Bi_2O_5$ and $TeO_2$, including 5 parts by weight $GeO_2$ and $Al_2O_3$, respectively, or 10 parts by weight of $Bi_2O_5$ and $CeO_2$ or $TeO_2$, respectively, per 100 parts by weight of (a),
   wherein x, y, and z are molar fractions, $0.05 \leq x \leq 0.25$, $0.60 \leq y \leq 0.85$, $0.05 \leq z \leq 0.225$, and $x+y+z=1$.

5. A microwave dielectric ceramic composition comprising:
   a) 100 parts by weight of $x.BaO\text{-}y.TiO_2\text{-}z.Nd_2O_3$ and
   b) 10 parts by weight of $Bi_2O_5$;
   wherein x, y, and z are molar fractions, $0.05 \leq x \leq 0.25$, $0.60 \leq y \leq 0.85$, $0.05 \leq z \leq 0.225$, and $x+y+z=1$.

* * * * *